US005449094A

United States Patent [19]

Behar et al.

[11] Patent Number: 5,449,094

[45] Date of Patent: Sep. 12, 1995

[54] DISPENSER WITH PLUNGING SLEEVE

[75] Inventors: Alain Behar, Eu; Pierre Amiel, Neuilly sur Seine; Jean-Louis Bougamont, Eu, all of France

[73] Assignee: Sofab, France

[21] Appl. No.: 60,781

[22] Filed: May 12, 1993

[30] Foreign Application Priority Data

May 18, 1992 [FR] France ................................ 92 05978
Jul. 24, 1992 [FR] France ................................ 92 09114

[51] Int. Cl.[6] ................................................ G01F 11/00

[52] U.S. Cl. .................................. 222/321.3; 222/386

[58] Field of Search ................ 222/321, 385, 386, 387

[56] References Cited

U.S. PATENT DOCUMENTS

| | | | |
|---|---|---|---|
| 2,992,052 | 7/1961 | DeJohn | 222/386 X |
| 3,129,854 | 4/1964 | Boehm et al. | 222/321 |
| 3,596,808 | 8/1971 | Corsette | 222/385 X |
| 4,728,008 | 3/1988 | Graf et al. | 222/321 |
| 4,817,829 | 4/1989 | Fuchs et al. | 222/259 |
| 5,037,009 | 8/1991 | Shea | 222/386 |
| 5,085,350 | 2/1992 | Sugita | 22/386 X |

FOREIGN PATENT DOCUMENTS

| | | | |
|---|---|---|---|
| 0446513 | 9/1991 | European Pat. Off. | B05B 11/02 |
| 2668082 | 4/1992 | France | B05B 11/02 |

*Primary Examiner*—Andres Kashnikow
*Assistant Examiner*—Lisa Douglas
*Attorney, Agent, or Firm*—Pennie & Edmonds

[57] ABSTRACT

This invention has as its subject a dispensing device for fluid-like products, composed of a container having a cylindrical drum, of which one end is provided with a movable base and the other end includes a neck which is capped by a distributor assembly including a pump with axial intake which is fitted onto a plunger sleeve. The lower face of the sleeve penetrates into the neck of the container during the fixing of the distributor assembly in the neck of the container, coming into position in sliding sealing engagement with a bearing surface of the neck.

12 Claims, 2 Drawing Sheets

A
B
8
7a
6
7
5
4d
9b
5c
4e
10
4
5a
9a
4b
4c
5b
4a
1
2
3
1c
N
1b
1a
P
2a
2b

DISPENSER WITH PLUNGING SLEEVE

BACKGROUND OF THE INVENTION

Dispensers for more or less fluid products are known, formed of a casing having a cylindrical drum, of which one end, usually its lower end, is provided with a movable base normally retained by some kind of ring, and which is capped at the opposite end by a distributor pump with axial intake. Atmospheric pressure causes the base to ascend progressively as the product is removed by the pump. This both enables the paste or cream, or indeed liquid, to be sheltered from the air and allows them to be methodically expelled during use.

The components are, with advantage, molded parts suitable for assembling together by simple fitting into one another.

Such a dispenser may be designed so that it is filled when upside down before the base is fitted, but it appears more advantageous to operate in the normal position, finishing with the mounting of the pump. The simplest approach for the packager is then to inject the product into the casing already provided with its base, and to then close the container in one operation by fitting a distributor sub-assembly, comprising a pump entirely assembled onto a leaktight sleeve for reduction in diameter.

This sleeve comprises a seating forming the bottom part of the distributor pump, or intended for receiving it, and traversed by the intake orifice, and a diaphragm which connects this seating to the receptacle, capping the latter to create inside it a funnel-shaped roof, the shape of which corresponds to the shape of the movable base, which eliminates losses of product. The roof may carry a well which will receive the pump body.

A disadvantage is, however, that it becomes difficult to eliminate the presence of a pocket of air capable of depriming the pump or at least of interfering with its proper functioning.

SUMMARY OF THE INVENTION

The invention proposes to eliminate the disadvantages of the prior constructions by giving to the sealing sleeve the form of a plunger, the front face of which will penetrate slideably into the neck during the fixing of the distributor assembly, becoming entirely situated below the upper edge of the corresponding bearing area of said neck.

Whatever the consistency of the product may then be, it thus becomes possible to fill the casing with a sufficient amount of the product for this product subsequently, during closure, to be forced back by means of the sealing sleeve so as to complete the expulsion of the air from the receptacle towards the body of the pump, making use of the intentional or spontaneous opening of the inlet valve to this pump and, possibly also, when the structure of the pump allows this, to discharge this air at least partly through the opening of its outlet valve.

It is advisable for this face to form a sufficiently sloping roof, inclined in principle at least 20°, to prevent bubbles of air sticking to its face.

Advantageously, the sealing action will come into play only at the end of the stroke, on either side of a dead space, to which to the sleeve will previously have expelled a portion of the air and of the product.

BRIEF DESCRIPTION OF THE DRAWINGS

These characteristics will be explained below by the description of advantageous examples, with reference to the drawings of which.

DETAILED DESCRIPTION OF THE INVENTION

Figure 1:
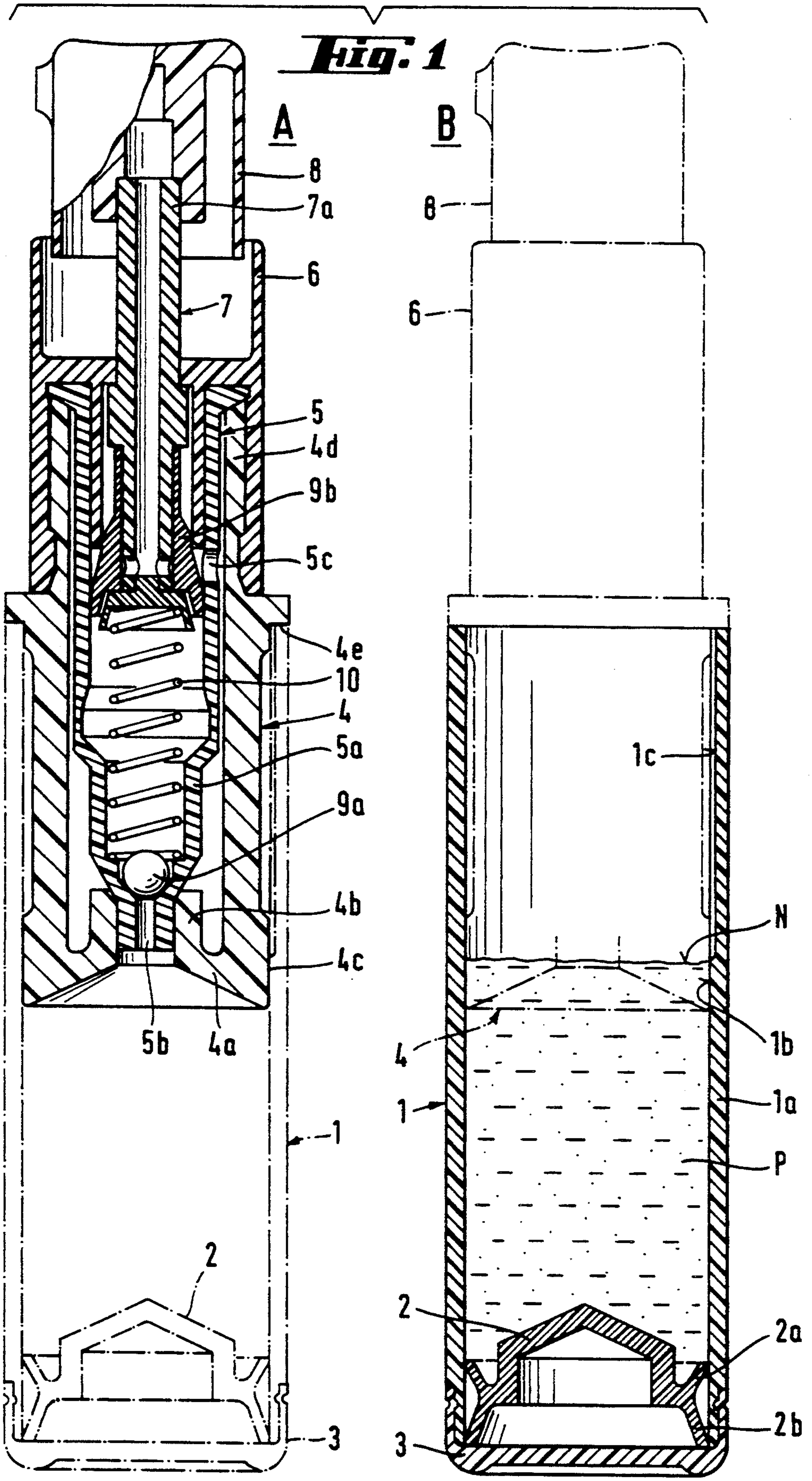
FIG. 1 is a longitudinal section through the two subassemblies, the upper one A and lower one B, of a dispenser in course of manufacture.

The dispenser shown in FIG. 1 comprises a casing 1 having a drum *1a*, cylindrical but not necessarily circular, housing a piston 2 of the same contour, which serves as movable base; this piston is retained by a ring 3, which may range from a simple projection or circlip to a double-bottom allowing an entry for air. This subassembly B forms as a whole the container.

The movable base 2 preferably has two lips *2a* and *2b*, pointing in opposite directions. The lip *2a*, which is set back from its upper face, serves essentially as a scraper during the upward movement under the effect of the suction created by the pump, preventing any nonuniformity of consistency and behavior of the product from lifting the lip *2b* which, for its part, serving essentially for preventing any inlet of air through the base, fulfills the principal function and forms the sealing lip proper.

A sleeve 4 houses the distributor pump 5. Its body *5a* is closed by its collar 6, which retains the piston 7, the piston-rod *7a* of which forms a nozzle stem carrying a head 8 serving as pusher and provided with a suitable nozzle. This sub-assembly A forms the distributor.

In known manner, the pump has a ball inlet valve *9a* and a sliding sleeve outlet valve *9b*. At rest, the piston 7, which is biased upwards by its spring 10, also makes a seal against the collar 6 by the way of the sleeve *9b*.

The diaphragm *4a* of the sleeve 4 carries a central orifice bordered by a seating *4b*, against which the lower end of the pump, where its intake *5b* is located, fits in sealing manner during assembling, an outer bearing face *4c* and a well in which the body *5a* is housed, its flange *4d* finally fixing the pump by means of its collar 6.

The conical lower face of the diaphragm *4a* leads as a funnel towards its orifice in the axis of which the pump is situated; during assembling of the two subassemblies, it will create the roof of the container; the profile of the movable base 2 corresponds to it, in such a way as to prevent losses of product at the end of use. If the pump is provided with a vent *5c*, this vent will be neutralized by the sleeve 4, which will thus keep the reservoir of product P protected from the air.

The sleeve is adapted to be fitted onto the casing 1 to close it at its upper part, while a shoulder *4e* may advantageously arrest it as a stop or teeth may hold it on a flange of the neck.

According to this invention, its outer lateral wall face slides here in the manner of a plunger, in a sealed manner at the end of the stroke along a corresponding internal bearing surface *1b* over a distance sufficient to bring the intake below the upper edge of this bearing surface, but while it is in the upper part passages *1c* initially allow escape of the air.

This form of construction enables all of the components to be produced by injection molding and, with advantage, to be assembled by fitting them into or onto one another.

The product P, for the purpose of charging it into the apparatus, is placed in the casing 1 in a quantity corresponding accurately to the desired dose, rising to a more or less uniform level depending upon its viscosity, close to a mean level N. During the fitting on of the upper sub-assembly, the sleeve 4 will expel the air to the outside and then, forming a seal, will expel to the pump the portion of air remaining trapped, lifting the inlet valve 9*a*; its lower face then reaching the product, it will expel to the intake 5*b* the portion initially remaining outside in relation to the final position of the funnel cone, approximately equal in volume to the internal volume of the pump, thus compelling the pump to be at least partly filled with product to facilitate its priming. It therefore compresses the air there and will even partly expel it to the outside against the resistance of the sleeve 9*b* if care has been taken to press hard on the piston, which may already be equipped with its head 8, in order to release the escape.

Figure 2:
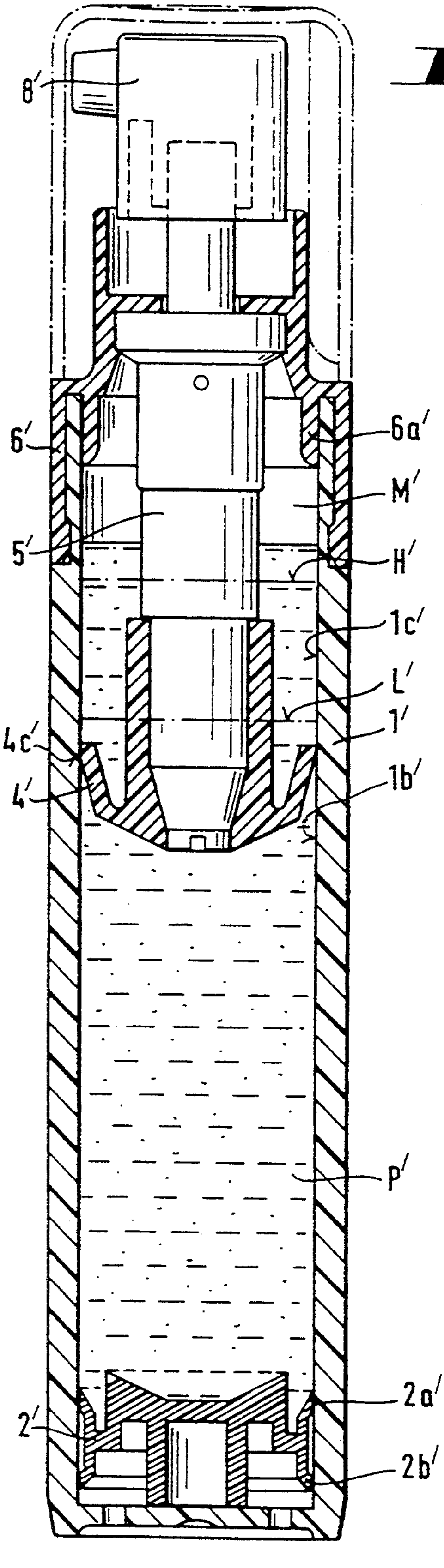
FIG. 2 is a longitudinal section of another embodiment of the dispenser.

FIG. 2 shows a form of embodiment in which the body of an analogous pump 5' is only fitted into its collar 6' which, on the other hand, itself serves as a reduction ring for fixing the distributor sub-assembly onto the neck of the container 1', whereas the sealing sleeve 4' is simply pushed on as a friction fit onto the lower part of the body of the pump 5'.

This solution is more advantageous in several respects. In the first place, the construction of the components is simpler. It will also be seen that there exists along the body of the pump, masked by the collar, a dead space M' having a volume of the order of five times the internal volume of the pump, and that the passage 1*c'* is formed by an inner bore of increased diameter, which a lip 6*a'* of this collar will close in sealed manner on completion of the assembling operation.

In fact, the process of filling described in relation to the version shown in FIG. 1 assumes that the relative tolerance to the quantity of product introduced into the casing 1' shall be less than the internal volume of the pump, or one dose, since it is not desirable that, from the start of the filled condition, this product shall penetrate into the head 8' and even overflow out of the distribution nozzle; now such a condition is one of the most difficult to satisfy in large-scale production, carried out at a high rate. If a minimal margin of error of the order of three doses is assumed, the level N (not shown) will vary between a minimum level L' close to the opening-out of the wall face 1*b'*, but still capable of supplying good priming to the pump, and a maximum level H' situated higher up.

During filling the product will thus, in its turn, by the action of the sections offered and the respective counter-pressures, first invade a notable part of the dead space M'. If the level L' is itself higher than the top edge of the wall face 1*b'*, the useful product capacity will be fixed accurately by coming into sealing of the sleeve 4', the excess being lost but remaining enclosed within the cartridge.

It will be noted also that it is then possible, as shown in the figure, to invert the cone defined by the front face of the sleeve without risk of leaving an air bubble at its upper part, which reduces slightly the quantity of collected air towards the pump.

Finally, it is not forbidden, at the cost of a certain loss of accuracy on the quantity of occluded air and therefore on the useful capacity, to dispense with the presence of any internal offset or diameter change creating a passage above the sealing area 1*b'*, and to give only to the skirt which supports the outer bearing face 4*c'* of the sleeve 4' adequate flexibility so that, while leaktight principally against external excess pressures, it allows during filling the escape of air, then of excess product, into the dead space under the effect of their temporary but appreciable compression.

Figure 3:
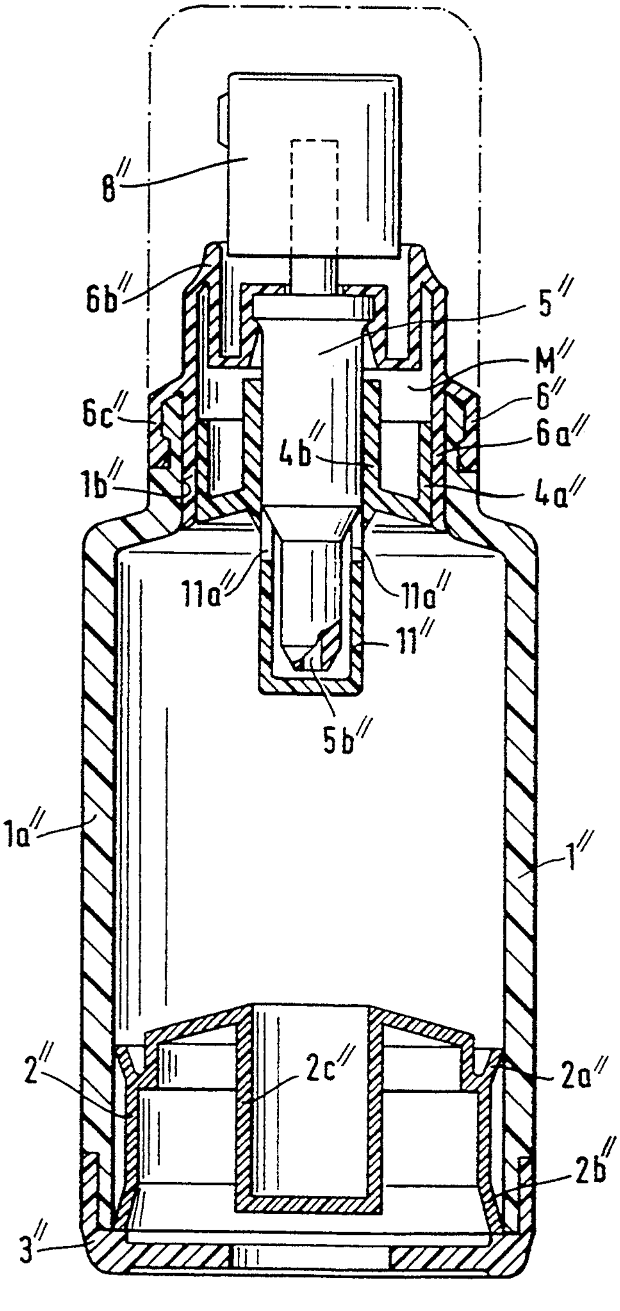
FIG. 3 is a longitudinal section of still another embodiment of the dispenser.

To reduce the overall height while continuing to use a standard pump with axial nozzle and intake, it will sometimes be possible to raise both the roof formed by the diaphragm of the sealing plunger sleeve and the effective level of the intake, by creating a siphon by means of an inverted bell fitting over the lower end of the pump body. Such a form of construction is shown in FIG. 3.

The casing 1" is provided with a drum having a cylindrical wall 1*a"* , with a neck having a narrowed internal bearing area 1*b"* and a movable base 2", fitted from the bottom.

The collar 6", which closes the pump 5", is folded back into a keeper ring 6*b"* before being stepped out as a skirt 6*c"*, which serves for fixing the pump onto the neck 1*b"*, the internal lip 6*a"* reinforcing the seal against the neck; it again thus serves as a reduction ring and fixing ring.

The sleeve 4" connects internally, in sealed manner with regard to external positive pressures, along its two bearing areas 4*b"* and 4*c"*, the body of the pump 5" to the neck 1*b"*, in the present case by means of the lip 6*a"*, against which it bears. Thus forming the roof of the container, it again constitutes a plunger ring adapted for expelling air from the container by simple pushing-in at the end of filling; but being sleeved at the top onto the body of the pump 5" its front face is on this occasion clearly above the lower end and the intake 5*b"* of this pump.

The pump 5", in its narrowest part containing the return spring for its internal piston, is capped by a bell 11", which brings up to the apex of the roof the effective level where, through apertures 11*a"*, the intake of product to the pump takes place through a siphon.

In variants, this bell could equally well form part of the pump body as serve itself for fixing the pump to the container, but it is preferable to use separate components, in order not to need to multiply the number of molds of complex shape according to the intended uses. This also makes it possible, conversely, depending upon the current example, to form in one piece the scavenging plunger 4" and its siphon bell 11", instead of fixing this bell onto the pump by relief elements which even become superfluous for its centering; all the components are still suitable for production by injection molding, the sleeve and bell forming a part of telescopic shape, the apertures being placed at their junction.

In order to avoid any loss of material, the movable base 2" should, of course, have a profile geometrically similar to that of the upper part of the container. It is very easy to do this by placing a basin 2*c"* at the center of the band which carries the air sealing lip 2*b"* and the scraper lip 2*a"*.

We claim:

1. Dispenser for a fluid product, formed of a container for said fluid product, said container being defined by a cylindrical drum, one end of which is provided with a movable base for sliding movement within said drum and the other end of which includes a neck in which a distributor pump assembly is disposed, said neck including an internal axially extending bearing surface having an upper edge and said distributor pump assembly including a pump having a section extending into said drum in radial spaced relation with the internal bearing surface of said neck and an axially located intake for receiving fluid product from said drum, said distributor pump assembly further including a sealing sleeve for sealing the pump section to the neck of the drum when said distributor pump assembly is located in an assembled position within said drum, said sealing sleeve having a lower face spaced axially along said drum from the base thereof when said distributor pump assembly is in said assembled position, the improvement wherein:

a) the distributor pump assembly is configured in relation to the neck of said drum for sliding insertion into said assembled position in said neck after said drum has been filled with said fluid product and the distributor pump assembly further includes a reduction ring member for fixing the distributor pump assembly to the drum in said assembled position;
b) the lower face of said sealing sleeve extends in sealing relation between said pump section and said bearing surface to close the radial space therebetween and is disposed below the upper edge of said bearing surface and in contact with the fluid product across the entire face when said distributor pump assembly is inserted into said assembled position within said drum; and
c) means are provided on at least one of said pump, drum, and sealing sleeve for removing any air in said drum during insertion of said distributor pump assembly into said assembled position.

2. Dispenser according to claim 1 wherein the axial intake of said pump is located at the level of the lower face of said sealing sleeve when said distributor pump assembly is in said assembled position within said drum.

3. Dispenser according to claim 2 wherein:

a) the neck of said drum includes an inner wall surface having an upper end; and
b) said means for removing air comprises a passageway that extends between said upper edge of said bearing surface and the upper end of the wall surface for permitting the escape of air during insertion of said distributor pump assembly into said assembled position within the drum.

4. Dispenser according to claim 1 wherein said sealing sleeve includes a flexible diaphragm section extending between said pump section and said drum to provide said means for removing air in said drum during insertion of said distributor pump assembly into said assembled position.

5. Dispenser according to claim 1 wherein:

a) the reduction ring connects the pump of the distributor pump assembly to the drum at one location along said pump; and
b) the sealing sleeve is connected to the pump of the distributor pump assembly at a location spaced from said reduction ring.

6. Dispenser according to claim 5 wherein a space between the reduction ring and the sealing sleeve defines an internal sealed volume within said drum for receiving air and liquid product from the space between the lower face of the sealing sleeve and the base of the drum during insertion of the distributor pump assembly into said assembled position within said drum.

7. Dispenser according to claim 6 wherein:

a) the neck of said drum includes an inner wall surface having an upper end to which said reduction ring is attached; and
b) said means for removing air comprises a passageway that extends from said bearing surface and into said space between said reduction ring and said sealing sleeve for permitting passage of air and liquid product into said sealed volume during insertion of said distributor pump assembly into said assembled position.

8. Dispenser according to claim 1 wherein the sealing sleeve includes an upper end and a lower end with the upper end connected to said reduction ring, which is in turn connected to the pump of the distributor pump assembly, and with the lower end connected to the neck of said drum and including said lower face.

9. Dispenser according to claim 1 wherein:

a) the lower face of said sealing sleeve is disposed above the axial intake of said pump when said distributor pump assembly is in said assembled position; and
b) the distributor pump assembly further includes an inverted bell-shaped member covering the axial intake of said pump in spaced relation therewith, said bell-shaped member extending upwardly from said axial intake to the lower face of said sealing sleeve and having openings therein at the level of said lower face for providing communication between said axial intake and the fluid product in said drum.

10. Dispenser according to claim 9 wherein said inverted bell-shaped member is formed in one piece with said sealing sleeve.

11. In a dispenser for liquid products, formed of a container having a cylindrical drum comprising a neck portion that includes a bearing area, one end of which container is provided with a movable base and which is capped at the opposite end by a distributor pump assembly that includes a reduction ring which serves to fix the assembly into said neck and that has axial intake, said ends being separated from one another by the neck of the container, said container being assembled with a sealing sleeve creating an internal roof, the improvement wherein said sleeve (4) has the form of a plunger, the lower face of which penetrates into the neck of the container (1) during the fixing of said distributor pump assembly (4/5/6), said lower face becoming sealingly situated, at the end of its travel, below the upper edge of the corresponding bearing area **(1*b*) of this neck, and said sleeve (4) provides sealing independently of reduction ring (6) which serves to fix the distributor sub-assembly onto the neck, said reduction ring being formed by a collar enclosing the pump, and said sleeve (4) provides a friction fit onto body (5*a*)** of the pump.

12. In a dispenser for liquid products, formed of a container having a cylindrical drum comprising a neck portion that includes a bearing area and a product reservoir, one end of which container is provided with a movable base and which is capped at the opposite end by a distributor pump assembly that includes a reduction ring which serves to fix the assembly into said neck and that has axial intake, said ends being separated from one another by the neck of the container, said container being assembled with a sealing sleeve having an external bearing face and creating an internal roof, the improvement wherein said sleeve (4) has the form of a plunger, the lower face of which penetrates into the neck of the container (1) during the fixing of said distributor pump assembly (4/5/6), said lower face becoming sealingly situated, at the end of its travel, below the upper edge of the corresponding bearing area (**1*b*) of this neck, and by a double seal provided by the sealing sleeve and the reduction ring (4*c*, 6*a*) allowing evacuation of air and of excess product (P) along external bearing face (4*c*) of the sleeve (4) towards an intermediate dead space (M), wherein a passage (1*c***), at the top of the neck, provides communication between product reservoir (P) and the intermediate space (M).

* * * * *